United States Patent
Bansal et al.

(10) Patent No.: US 11,106,482 B2
(45) Date of Patent: Aug. 31, 2021

(54) CONNECTIVITY MIGRATION IN A VIRTUAL EXECUTION SYSTEM

(71) Applicant: Microsoft Technology Licensing, LLC, Redmond, WA (US)

(72) Inventors: Deepak Bansal, Yarrow Point, WA (US); Sameer Arun Verkhedkar, Issaquah, WA (US); Sudheer Vaddi, Redmond, WA (US); Praveen Balasubramanian, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 185 days.

(21) Appl. No.: 16/428,833

(22) Filed: May 31, 2019

(65) Prior Publication Data

US 2020/0379790 A1 Dec. 3, 2020

(51) Int. Cl.
*G06F 9/455* (2018.01)
*G06F 9/48* (2006.01)

(52) U.S. Cl.
CPC ...... *G06F 9/45558* (2013.01); *G06F 9/45545* (2013.01); *G06F 9/4856* (2013.01); *G06F 2009/4557* (2013.01); *G06F 2009/45595* (2013.01)

(58) Field of Classification Search
CPC ............. G06F 9/45545; G06F 9/45558; G06F 9/4856; G06F 2009/4557; G06F 2009/45595
See application file for complete search history.

(56) References Cited

U.S. PATENT DOCUMENTS

| | | | |
|---|---|---|---|
| 7,424,710 B1 | 9/2008 | Nelson et al. | |
| 8,478,801 B2 * | 7/2013 | Hutchins | G06F 9/455 707/829 |
| 10,521,315 B2 * | 12/2019 | Antony | G06F 11/1438 |
| 2008/0201414 A1 | 8/2008 | Amir Husain et al. | |
| 2014/0108655 A1 | 4/2014 | Kumar et al. | |

(Continued)

OTHER PUBLICATIONS

Burton, Robert, et al., "Application-Driven TCP Recovery and Non-Stop BGP", IEEE, Jun. 24-27, 2013, 12 pages.

(Continued)

*Primary Examiner* — Jacob D Dascomb
(74) *Attorney, Agent, or Firm* — Newport IP, LLC; Han Gim

(57) ABSTRACT

Described herein is a system and method of connectivity migration of an executing virtual application and/or guest operating system. State associated with a first instance of an application and/or a guest operating system executing on a first virtual machine is captured. Information regarding connectivity state associated with a plurality of running connections between the first virtual machine and client device(s) is also captured (e.g., layers 2, 3 and 4). The captured state information can be provided to a second virtual machine which utilizes the captured station information to establish state for a second instance of the application, a second instance of the guest operating system, and/or connectivity of the plurality of running connections between the second virtual machine and client device(s). The state of the second instance of the application can be synchronized with the state of the second instance of the guest operating system.

20 Claims, 7 Drawing Sheets

(56) References Cited

U.S. PATENT DOCUMENTS

| | | |
|---|---|---|
| 2017/0139743 A1 | 5/2017 | Fries et al. |
| 2017/0315859 A1 | 11/2017 | Marshall et al. |
| 2018/0004560 A1 | 1/2018 | Shankar et al. |
| 2018/0132120 A1 | 5/2018 | Navasivasakthivelsamy et al. |
| 2018/0191471 A1 | 7/2018 | Elhaddad et al. |
| 2020/0177543 A1* | 6/2020 | Chang .................. H04L 61/103 |
| 2020/0259759 A1* | 8/2020 | Shalev ................... H04L 45/74 |
| 2020/0358872 A1* | 11/2020 | Shribman ............. H04L 67/141 |

OTHER PUBLICATIONS

Firestone, Daniel, "VFP: A Virtual Switch Platform for Host SDN in the Public Cloud", Usenix, Mar. 27-29, 2017, 15 pages.

"International Search Report and Written Opinion Issued in PCT Application No. PCT/US2020/029176", dated Aug. 17, 2020, 13 Pages.

* cited by examiner

CONNECTIVITY MIGRATION IN A VIRTUAL EXECUTION SYSTEM

BACKGROUND

Application(s) and/or guest operating system(s) executing on a virtual machine may need to be updated or patched. For example, the updates can need to be performed periodically to reflect a current version of the application and/or guest operating system. Alternatively, the updates can be performed to correct issue(s) identified in the application and/or guest operating system (e.g., security-related, discovered vulnerability(ies), bug(s)).

The application and/or guest operating system can be executing utilizing stateful connection(s). Stopping execution of the application and/or guest operating system on the virtual machine to perform an update/patch can cause the connection(s) to be terminated. This can result in significant negative impact to a user, for example, requiring the user to re-login and/or otherwise authenticate in order to re-establish the connection(s).

SUMMARY

Described herein is a system for connectivity migration of a first virtual machine to a second virtual machine in a virtual execution system, comprising: a computer comprising a processor and a memory having computer-executable instructions stored thereupon which, when executed by the processor, cause the computer to: at the second virtual machine: receive captured state of a first instance of an application, captured state of a first instance of a guest operating system, and, captured connectivity state associated with a plurality of running connections between the first virtual machine and one or more client devices; establish connectivity of the plurality of running connections between the second virtual machine and the one or more client devices based, at least in part, upon the captured connectivity state; establish state of a second instance of the guest operating system executing on the second virtual machine based, at least in part, upon the captured state of the first instance of the guest operating system; establish state of a second instance of the application executing on the second virtual machine based, at least in part, upon the captured state of the first instance of the guest operating system; and synchronize the state of the second instance of the application with the state of the second instance of the operating system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
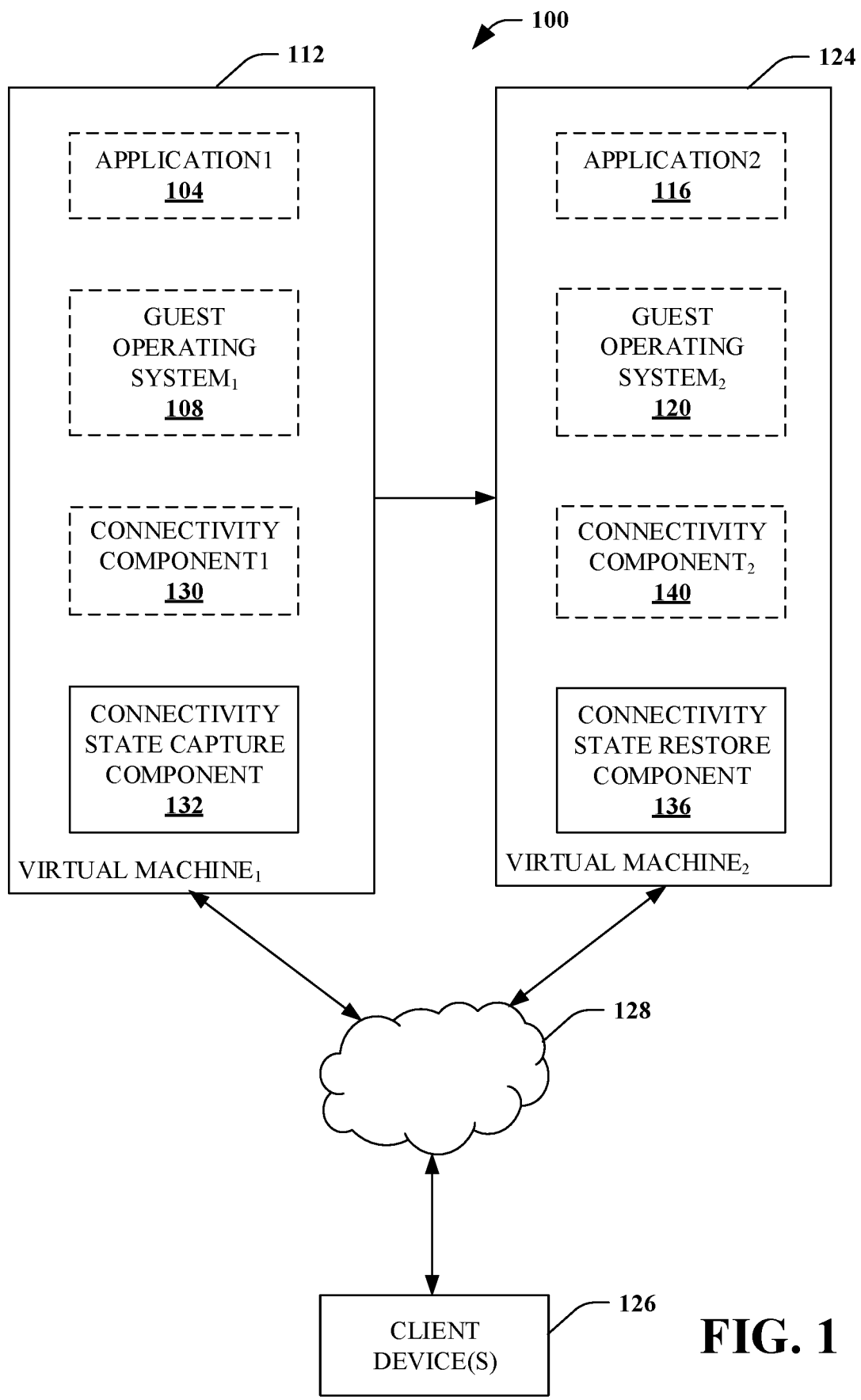
FIG. 1 is a functional block diagram that illustrates a system for connectivity migration in a virtual execution system.

Various technologies pertaining to connectivity migration of an executing virtual application and/or guest operating system are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding connectivity migration of an executing virtual application and/or guest operating system. What follows are one or more exemplary systems and methods.

Aspects of the subject disclosure pertain to the technical problem of migrating connectivity information of an executing virtual application and/or guest operating system. The technical features associated with addressing this problem involve capturing state of a first instance of an application executing on a first virtual machine; capturing state of a first instance of a guest operating system executing on the first virtual machine; capturing connectivity state associated with a plurality of running connections between the first virtual machine and one or more client devices; providing the captured state of the first instance of the application, the captured state of the first instance of the guest operating system, and, the captured connectivity state to a second virtual machine; establishing connectivity of the plurality of running connections between the second virtual machine and the one or more client devices based, at least in part, upon the captured connectivity state; establishing state of a second instance of the guest operating system executing on the second virtual machine based, at least in part, upon the captured state of the first instance of the guest operating system; establishing state of a second instance of the application executing on the second virtual machine based, at least in part, upon the captured state of the first instance of the guest operating system; and synchronizing the state of the second instance of the application with the state of the second instance of the operating system. Accordingly, aspects of these technical features exhibit technical effects of more efficiently and effectively migrating connectivity information of an executing virtual application and/or guest operating system to preserve existing connection(s), for example, reducing computer resource(s) (e.g., processing time) and/or bandwidth consumption.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Terminating execution of an application and/or guest operating system of a virtual machine to perform an update/patch of the application and/or guest operating system can cause stateful connection(s) to be terminated. This can result in significant negative impact to a user, for example, requiring the user to re-login and/or otherwise authenticate in order to re-establish the connection(s).

Described herein is a system and method for connectivity migration of a first virtual machine to a second virtual machine in a virtual execution system (e.g., live migration of a virtual application, guest operating system, and/or running connection(s)). Connectivity migration can be performed in order to facilitate update and/or patching of a virtual application and/or a guest operating system executing on a first virtual machine (VM). In response to a migration request, the application and/or guest operating system are responsible for capturing state (if any) needed to re-establish the application and/or guest operating system on a second virtual machine. This captured state can be provided to an application or guest operating system of the second virtual machine to re-establish the application and/or guest operating system.

The first virtual machine further captures information regarding connectivity state associated with the virtual application and/or the guest operating system (e.g., established running/live connection(s)). The captured connectivity state is then provided to the second virtual machine to seamlessly re-establish flow connection(s) of the application and/or guest operating system on the second virtual machine.

For purposes of explanation and not limitation, the systems and methods described herein are discussed in the context of virtual machine migration. However, in some embodiments, the systems and methods described herein can be utilized to migrate native systems.

Referring to FIG. 1, a system for connectivity migration from a first virtual machine to a second virtual machine in a virtual execution system 100 is illustrated. The system 100 can perform connectivity migration in order to allow update and/or patching of an application 104 and/or a guest operating system 108 executing on a first virtual machine 112.

For example, several scenarios can require connection migration (e.g., Transmission Control Protocol (TCP) information) from one virtual machine to another virtual machine. This includes network virtual application(s) (NVAs) which operate in active-passive mode or n-active mode and when one of the instances fail, the NVAs desire to migrate the connection(s) to another instance. Similarly, SQL data warehouse (SQL-DW) can have long-lived TCP connections for long running query(ies) and having TCP connection(s) to be migrated from one instance to another, for example, when one of the VM needs to be updated (e.g., guest operating system update and/or rolling out updated application) and/or fails. The system 100 facilitates migration of running/live connection(s) (e.g., TCP/IP) at the infrastructure level.

In some embodiments, a migration request can be generated by the application 104. For example, the application 104 can need to be updated to a new version. In some embodiments, the migration request can be generated by the guest operating system 108. For example, the guest operating system 108 can need to be patched. In some embodiments, the migration request can be generated by the first virtual machine 112 (e.g., host operating system). For example, the first virtual machine 112 can be desirous of updating the application 104 and/or the guest operating system 108.

In response to the migration request, the application 104 and/or guest operating system 108 can be responsible for capturing state (if any) needed to re-establish the application 104 (e.g., SQL session state) and/or guest operating system 108 as an application 116 and a guest operating system 120, respectively, on a second virtual machine 124. In this manner, the captured state can be provided to the application 120 and or the guest operating system 124 of the second virtual machine 124 to re-establish the application 104 and/or guest operating system 108 (of the first virtual machine 112) on the second virtual machine 124. The first virtual machine 112 and the second virtual machine 124 can be communicatively connected to one or more client device(s) 126 using a network 128 (e.g., the Internet).

In some embodiments, the application 116 and the application 104 are instances of a same version of an application. In some embodiments, the application 116 and the application 104 are instances of different versions of an application. In some embodiments, the guest operating system 120 and the guest operating system 108 are instances of a same version of a guest operating system. In some embodiments, the guest operating system 120 and the guest operating system 108 are instances of different versions of the guest operating system.

The first virtual machine 112 can further include a connectivity component 130 that manages connectivity of the first virtual machine 112 including the application 104 and/or the guest operating system 108. In some embodiments, the connectivity component 130 employs a layered model, as discussed below. A connectivity state capture component 132 of the first virtual machine 112 further captures connectivity state associated with the application 104 and/or the guest operating system 108. The captured connectivity state is then provided to a connectivity state restore component 136 of the second virtual machine 124 to seamlessly re-establish flow connection(s) of the application and/or guest operating system on the second virtual machine 116 via a connectivity component 140.

In some embodiments, the application 104, the guest operating system 108 and the connectivity state capture component 132 receive the migration request at substantially the same time. In this manner, the state of the application 104, the state of guest operating system 108 and the connectivity state can be captured at substantially the same time. In some embodiments, the state of the application 104, the state of guest operating system 108, and/or the connectivity state can be captured substantially in parallel. In some embodiments, the state of the application 104, the state of guest operating system 108 and/or the connectivity state can be captured sequentially. In some embodiments, non-migration processing occurs by the application 116, the guest operating system 120, and/or the connectivity component 130 once the migration request has been received and/or a determination that migration can be performed safely has been made.

In some embodiments, the migration request is first provided to the application 104 and/or the guest operating system 108. For example, transaction(s) being performed by the application 104 and/or the guest operating system 108 can be completed and/or placed in an expected state (e.g., suspended, failed) to allow the application 104 and/or the guest operating system 108 to be seamlessly migrated to the second virtual machine 116 (e.g., without significantly interrupting execution of the application 104 as experienced by a user). Once the application 104 and/or the guest operating system 108 determine that migration can be performed safely (e.g., application 104 and/or guest operating system 108 are in a stable state). Once it is determined that migration can be performed, provides the migration request to the first virtual machine 112, and, the application 104 and/or the guest operating system 108 captures state (if any).

In some embodiments, connectivity of the first virtual machine 112 can be viewed as a layered model:

TABLE 1

| Layer 7 | Application |
| Layer 6 | Presentation |
| Layer 5 | Session |
| Layer 4 | Transport |
| Layer 3 | Network |
| Layer 2 | Data Link |
| Layer 1 | Physical |

In some embodiments, the application 104 and/or the guest operating system 108 are responsible for capturing state (if any) associated with layers 5, 6, and/or 7 of the layered model of Table 1. The connectivity state capture component 132 can capture connectivity state associated with layers 2, 3, and/or 4 of the layered model of Table 1.

In some embodiments, with respect to the transport layer (layer 4), the connectivity state includes information regarding firewall state, transport security layer (TLS), encryption and/or decryption key(s), and certificate information associated with connectivity of the application 104. In some embodiments, with respect to the network layer (layer 3), the connectivity information can include an Internet Protocol (IP) address of the first virtual machine 112.

In some embodiments, the connectivity component 130 utilizes TCP to track information about connection(s) of the first virtual machine 112. At least some of this information can be stored in a transmission control block (TCB) which is a data structure that maintains information about endpoints (IP and port number) (e.g., socket handle(s)), status of connection(s), running data about the packets that are being exchanged, and/or, information regarding buffers for sending and receiving data. The TCB can further manage send and receive sequence number.

In response to a migration request, the connectivity state capture component 132 can save state associated with running connection(s) including the connection setup state, and/or sequence numbers. In some embodiments, the connectivity state capture component 132 can save some or all of the information stored in the TCB. In some embodiments, the connectivity state capture component 132 can further store an IP address of the first virtual machine for migration of the IP address to the second virtual machine (e.g., in the absence of a load balancer).

In some embodiments, the state captured by the application 104, the guest operating system 108, and/or the connectivity state capture component 132 is provided separately to the second virtual machine 124. In some embodiments, the state captured by the application 104, the guest operating system 108, and/or the connectivity state capture component 132 is serialized into a pre-defined data structure and provided to the second virtual machine 124 (e.g., securely).

The second virtual machine 124 utilizes the state captured by the application 104, the guest operating system 108, and/or the connectivity state capture component 132 of the first virtual machine 112 to re-establish the application and/or guest operating system as the application 116, the guest operating system 120, and/or a connectivity component 140, respectively, on the second virtual machine 124.

In some embodiments, the application 116, the guest operating system 120 and/or the connectivity component 140 of the second virtual machine 124 are executing before receipt of the captured state. Thereafter, the captured state is distributed to the application 116, the guest operating system 120, and/or the connectivity component 140 (e.g., sequentially or substantially in parallel) to re-establish the application.

The connectivity state restore component 136 of the second virtual machine 124 can utilize the state captured by the connectivity state capture component 132 to re-establish connection(s) on the second virtual machine 124 (e.g., all running connection(s) are migrated from the first virtual machine 112 to the second virtual machine 124). In some embodiments, the connection(s) can be re-established in parallel, that is, layers 2, 3 and 4 at substantially the same time. In some embodiments, the connection(s) can be re-established sequentially, layer 2 first, followed by layer 3, followed by layer 4. Thus, firewall rule(s) and/or state relevant to particular connection(s) can be migrated from the first virtual machine 112 to the second first machine 124.

In some embodiments, the connectivity state restore component 136 can write or over write a TCB of the connectivity component 140 on the second virtual machine 124. In this manner, socket handle(s) utilized by the application 104 can continue to be utilized by the application 116.

In some embodiments, information regarding socket handle(s) of the TCB of the connectivity component 140 can be provided to the application 116. Accordingly, socket handle(s) utilized by the application 116 can be updated to reflect current value(s).

In some embodiments, the connectivity component 140 can store information regarding mapping of socket handle(s) in the TCB of the connectivity component 130 to socket handle(s) in the TCB of the connectivity component 140. Thus, the application 116 can continued to use socket handle(s) utilized by the application 104 with the connectivity component 140 translating the socket handle(s) before utilizing the socket handle(s) for communication.

In some embodiments, the elapsed time in which capturing state, transmitting state, and restoring state occurs is less than a pre-defined TCP/IP timeout period (e.g., nine seconds). In this manner, packets received by the first virtual machine 112 (and not processed) will be resent and processed by the second virtual machine 124 once migration has been performed. Thus, while the client may experience packet loss and latency, retry(ies) will recover the losses with minimal impact to the client (e.g., no loss of connection(s)).

Figure 2:
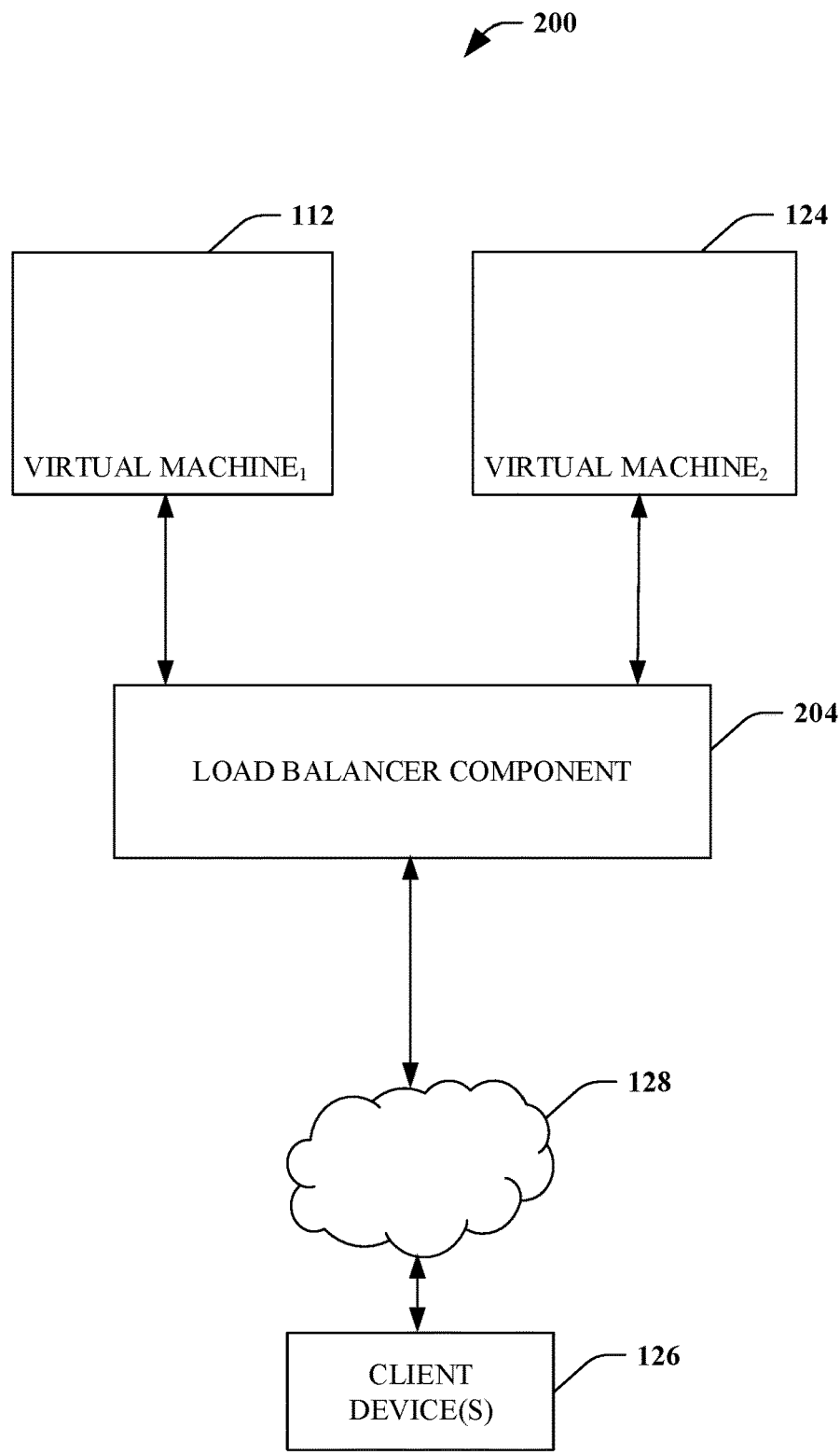
FIG. 2 is a functional block diagram that illustrates a system for connectivity migration in a virtual execution system.

Referring to FIG. 2, a system for connectivity migration in a virtual execution system 200 is illustrated. The system 200 includes the first virtual machine 112 and the second virtual machine 124, as discussed above. The system 200 further includes a load balancer component 204 that is an intermediary between the client device(s) 126 and the virtual first virtual machine 112.

The load balancer component 204 allows multiple virtual machines to be associated with a single virtual network. Network messages that are address to the virtual network address are received by the load balancer component 204, which decides which of multiple virtual machines are to handle the network message. The load balancer 204 then forwards the network message to the particular virtual machine.

During connectivity migration, the load balancer component 204 receives the connectivity migration request from the first virtual machine 112. In some embodiments, the application 104 and/or guest operating system 108 can call an application program interface (API) on the load balance component 204. In response to the receipt of migration request, the load balancer component 204 temporarily stops forwarding network message(s) which would be forwarded to the first virtual machine 112.

In some embodiments, an IP address of the first virtual machine 112 is not migrated to the second virtual machine 124. Instead, the load balancer component 204 can update mapping performed by the load balancer component 204 to redirect traffic designated for the IP address of the first virtual machine 112 to an IP address of the second virtual machine 124.

Once the state captured by the application 104, the guest operating system 108, and/or the connectivity state capture component 132 has been provided to the second virtual machine 124, the load balancer component 204 can be updated to restart forwarding of network message(s) directed to the first virtual machine 112 to the second virtual machine 124 (e.g., as the second virtual machine 124 has been re-assigned the IP address previously assigned to the first virtual machine 112).

In some embodiments, an ability to request connection migration is configurable by an administrator associated with the application 104 executing on the first virtual machine 112.

FIGS. 3-6 illustrate exemplary methodologies relating to connectivity migration in a virtual execution system. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
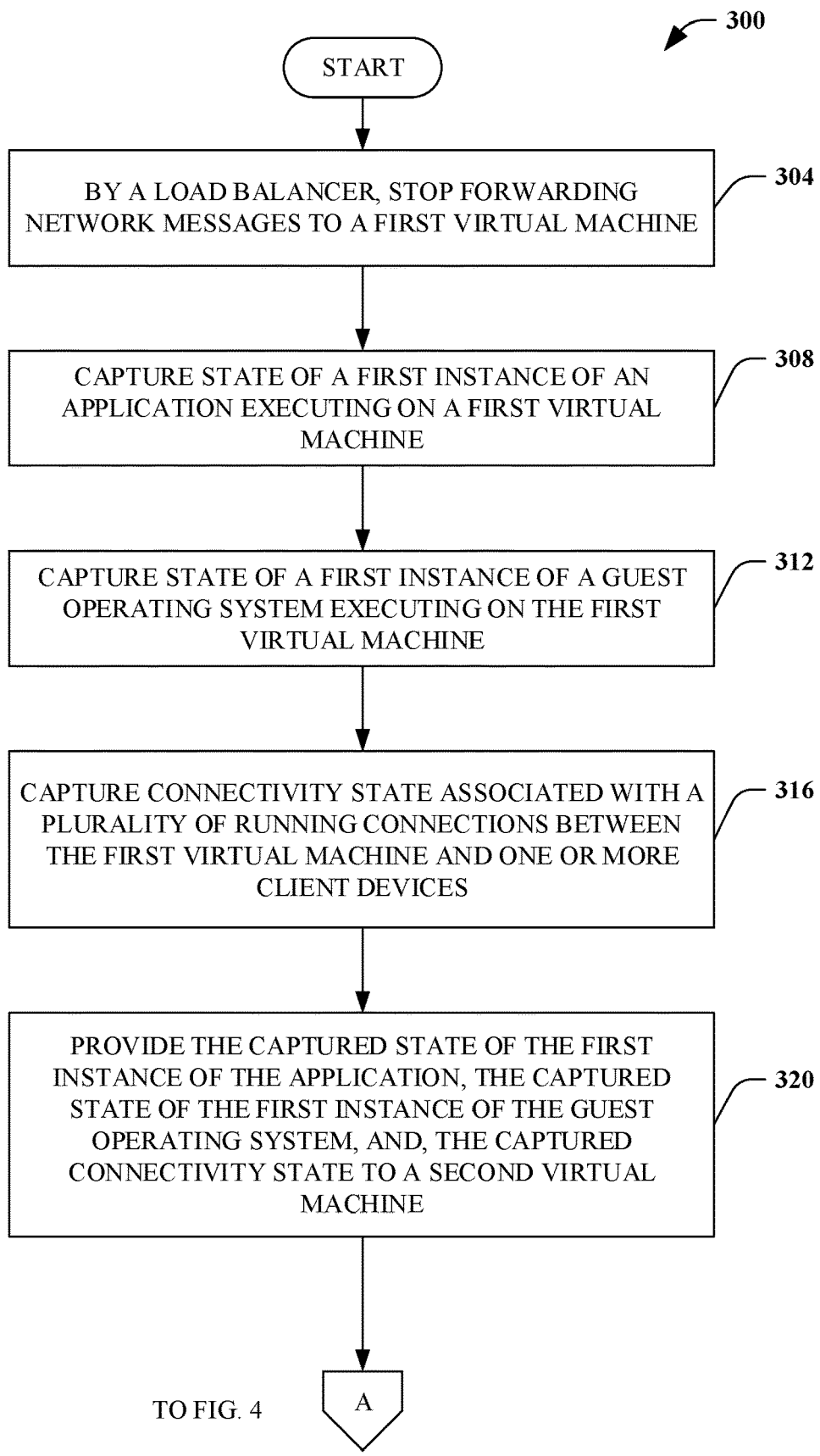
FIGS. 3 and 4 are flow charts that illustrate a method of connectivity migration in a virtual execution system.
Figure 4:
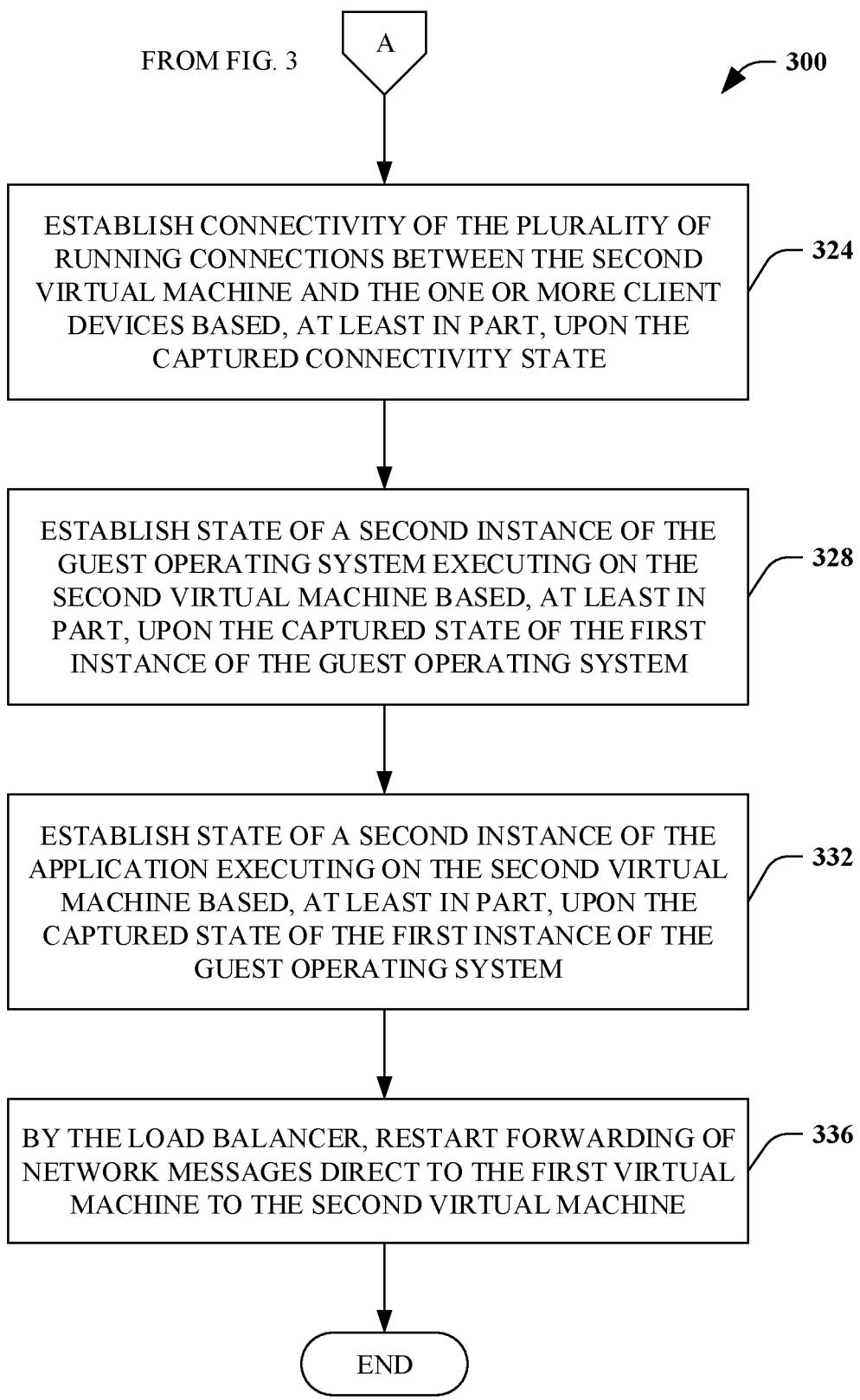

Referring to FIGS. 3 and 4, a method of connectivity migration in a virtual execution system 300 is illustrated. In some embodiments, the method 300 is performed by the system 100 and/or the system 200. In some embodiments, the method 300 is performed in response to receiving a connection migration request.

At 304, forwarding network messages to a first virtual machine is stopped by a load balancer (e.g., load balancer component 204). At 308, state of a first instance of an application executing on a first virtual machine is captured. At 312, state of a first instance of a guest operating system executing on the first virtual machine is captured. At 316, connectivity state associated with a plurality of running connections between the first virtual machine and one or more client devices is captured. At 320, the captured state of the first instance of the application, the captured state of the first instance of the guest operating system, and/or, the captured connectivity state is provided to a second virtual machine.

At 324, connectivity of the plurality of running connections is established between the second virtual machine and the one or more client devices based, at least in part, upon the captured connectivity state. At 328, state of a second instance of the guest operating system executing on the second virtual machine is established based, at least in part, upon the captured state of the first instance of the guest operating system. At 332, state of a second instance of the application executing on the second virtual machine is established based, at least in part, upon the captured state of the first instance of the guest operating system. At 336, forwarding of network messages directed to the first virtual machine to the second virtual machine is restarted by the load balancer.

Figure 5:
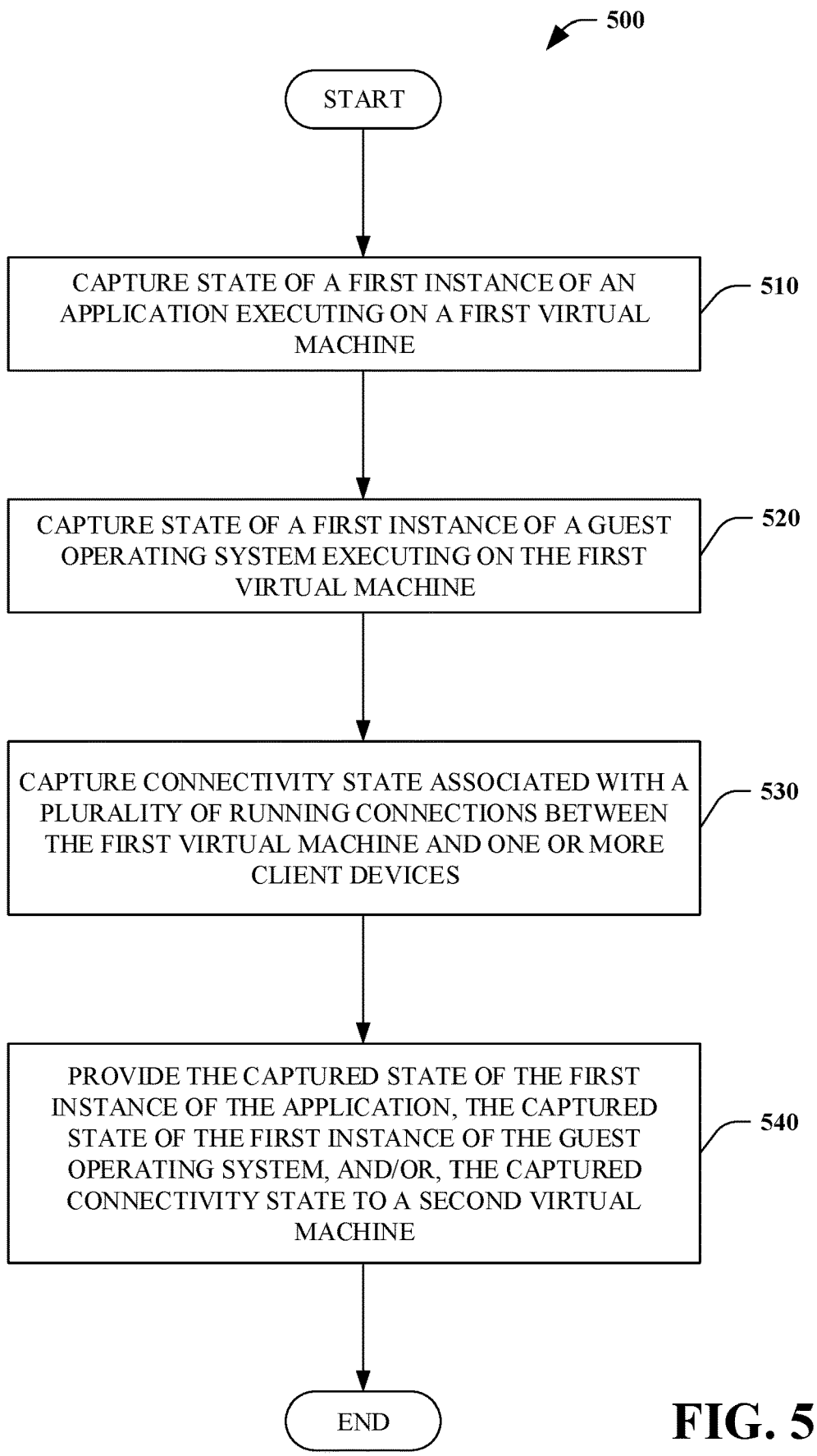
FIG. 5 is a flow chart that illustrates a method of connectivity migration from a first virtual machine to a second virtual machine in a virtual execution system.

Turning to FIG. 5, a method of connectivity migration from a first virtual machine to a second virtual machine in a virtual execution system 500 is illustrated. In some embodiments, the method 400 is performed by the first virtual machine 112.

At 510, state of a first instance of an application executing on a first virtual machine is captured. At 520, state of a first instance of a guest operating system executing on the first virtual machine is captured. At 530, connectivity state associated with a plurality of running connections between the first virtual machine and one or more client devices is captured. At 540, the captured state of the first instance of the application, the captured state of the first instance of the guest operating system, and/or, the captured connectivity state is provided to a second virtual machine.

Figure 6:
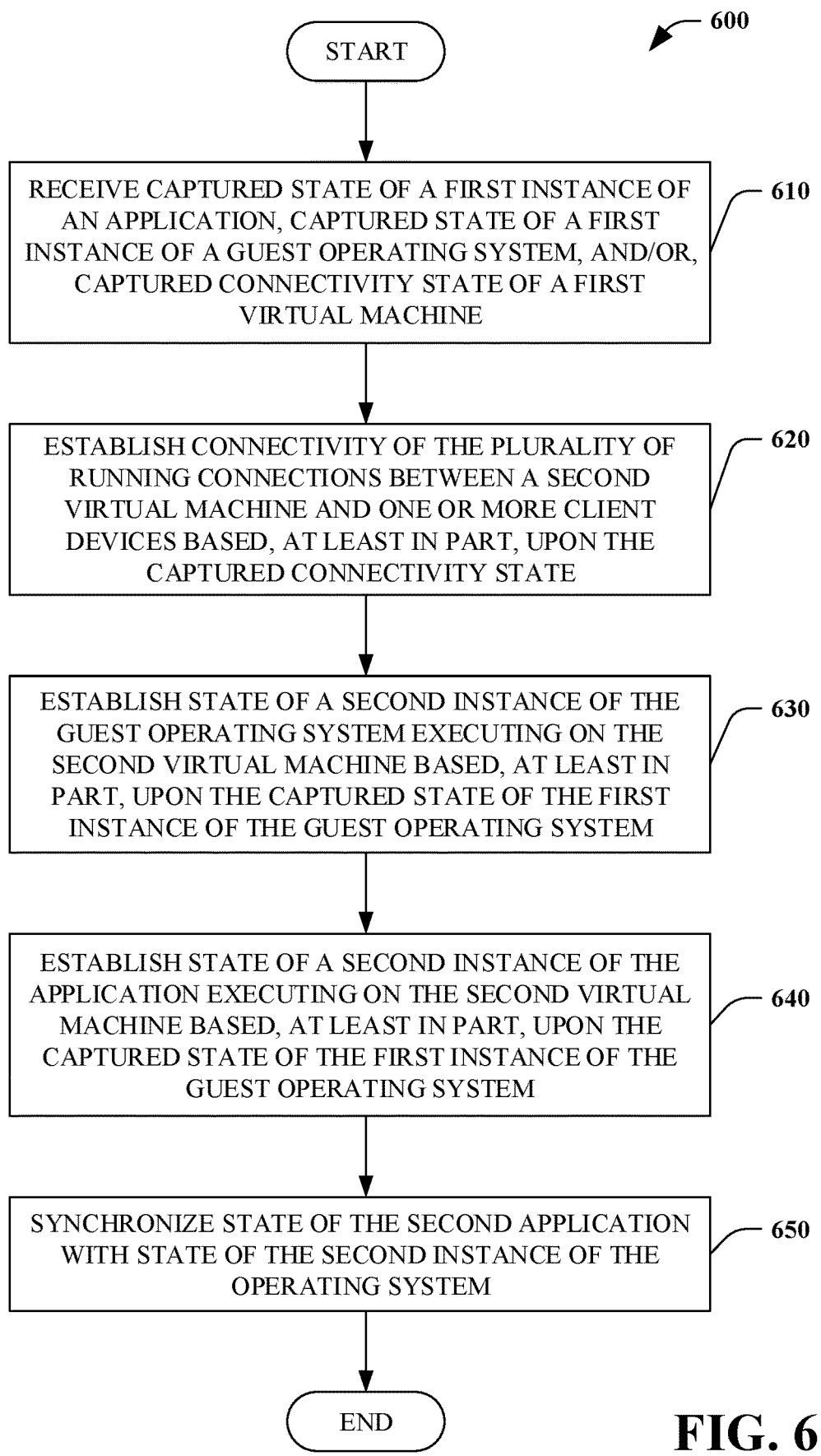
FIG. 6 is a flow chart that illustrates a method of connectivity migration from a first virtual machine to a second virtual machine in a virtual execution system.

Next, referring to FIG. 6, a method of connectivity migration from a first virtual machine to a second virtual machine in a virtual execution system 600 is illustrated. In some embodiments, the method 400 is performed by the second virtual machine 124.

At 610, captured state of a first instance of an application, captured state of a first instance of a guest operating system, and/or captured connectivity state of a first virtual machine is received by a second virtual machine. At 620, connectivity of the plurality of running connections is established between the second virtual machine and one or more client devices based, at least in part, upon the captured connectivity state. At 630, state of a second instance of the guest operating system executing on the second virtual machine is established based, at least in part, upon the captured state of the first instance of the guest operating system. At 640, state of a second instance of the application executing on the second virtual machine is established based, at least in part, upon the captured state of the first instance of the guest operating system.

At 650, state of the second instance of the application is synchronized with the state of the second instance of the guest operating system. In some embodiments, information regarding socket handle(s) of the TCB of the second virtual machine can be provided to the second instance of the application. Accordingly, socket handle(s) utilized by the second instance of the application can be updated to reflect current value(s).

In some embodiments, the second virtual machine can store information regarding mapping of socket handle(s) in the TCB of the first virtual machine to socket handle(s) in the TCB of the second virtual machine. Thus, the second instance of the application can continue to use socket handle(s) utilized by the first instance of the application with the second virtual machine translating the socket handle(s) before utilizing the socket handle(s) for communication.

Described herein is a system for migration from a first virtual machine to a second virtual machine in a virtual execution system, comprising: a computer comprising a processor and a memory having computer-executable instructions stored thereupon which, when executed by the processor, cause the computer to: at the second virtual machine: receive captured state of a first instance of an application, captured state of a first instance of a guest operating system, and, captured connectivity state associated with a plurality of running connections between the first virtual machine and one or more client devices; establish connectivity of the plurality of running connections between the second virtual machine and the one or more client devices based, at least in part, upon the captured connectivity state; establish state of a second instance of the guest operating system executing on the second virtual machine based, at least in part, upon the captured state of the first instance of the guest operating system; establish state of a second instance of the application executing on the second virtual machine based, at least in part, upon the captured state of the first instance of the guest operating system; and synchronize the state of the second instance of the application with the state of the second instance of the operating system.

The system can include the memory having further computer-executable instructions stored thereupon which, when executed by the processor, cause the computer to: at the first virtual machine: capture state of the first instance of the application executing on the first virtual machine; capture state of the first instance of the guest operating system executing on the first virtual machine; capture connectivity state associated with the plurality of running connections between the first virtual machine and the one or more client devices; and provide the captured state of the first instance of the application, the captured state of the first instance of the guest operating system, and, the captured connectivity state to the second virtual machine.

The system can further include wherein capturing connectivity state comprises storing information regarding a firewall state associated with connectivity of the first instance of the application, and, storing information regarding a transport security layer associated with connectivity of the first instance of the application.

The system can further include wherein capturing connectivity state comprises storing information regarding at least one of an encryption key or a decryption key associated with connectivity of the first instance of the application. The system can further include wherein capturing connectivity state comprises storing information regarding an Internet Protocol (IP) address of the first virtual machine. The system can further include wherein capturing connectivity state comprises storing information regarding a transmission control block associated with running connections of the first virtual machine.

The system can further include wherein the transmission control block maintains information about endpoints, status of the running connections, data about packets that are being exchanged, and, information regarding buffers for sending and receiving data. The system can further include wherein the captured state of the first instance of the application, the captured state of the first instance of the guest operating system, and, the captured connectivity state is serialized into a pre-defined data structure. The system can further include wherein the second instance of the guest operating system executing and the second instance of the application are executing on the second virtual machine before the captured state of the first instance of the application, the captured state of the first instance of the guest operating system, and, the captured connectivity state are provided.

The system can include the memory having further computer-executable instructions stored thereupon which, when executed by the processor, cause the computer to: in response to a connectivity migration request, by a load balancer, stop forwarding network messages to the first virtual machine; and after state of the second instance of the application executing on the second virtual machine has been established, restart forwarding network messages directed to the first virtual machine to the second virtual machine. The system can further include wherein the first instance of the application is a different version of the application than the second instance of the application.

Described herein is a method of migration from a first virtual machine to a second virtual machine in a virtual execution system, comprising: at the second virtual machine: receiving captured state of a first instance of an application, captured state of a first instance of a guest operating system, and, captured connectivity state associated with a plurality of running connections between the first virtual machine and one or more client devices; establishing connectivity of the plurality of running connections between the second virtual machine and the one or more client devices based, at least in part, upon the captured connectivity state; establishing state of a second instance of the guest operating system executing on the second virtual machine based, at least in part, upon the captured state of the first instance of the guest operating system; establishing state of a second instance of the application executing on the second virtual machine based, at least in part, upon the captured state of the first instance of the guest operating system; and synchronizing the state of the second instance of the application with the state of the second instance of the operating system.

The method can further include capturing state of the first instance of an application executing on a first virtual machine; capturing state of the first instance of a guest operating system executing on the first virtual machine; capturing connectivity state associated with the plurality of running connections between the first virtual machine and the one or more client devices; providing the captured state of the first instance of the application, the captured state of the first instance of the guest operating system, and, the captured connectivity state to the second virtual machine.

The method can further include wherein capturing connectivity state comprises storing information regarding a firewall state associated with connectivity of the first instance of the application, and, storing information regarding a transport security layer associated with connectivity of the first instance of the application. The method can further include wherein capturing connectivity state comprises storing information regarding at least one of an encryption key or a decryption key associated with connectivity of the first instance of the application. The method can further include wherein capturing connectivity state comprises storing information regarding an Internet Protocol (IP) address of the first virtual machine. The method can further include wherein capturing connectivity state comprises storing information regarding a transmission control block associated with running connections of the first virtual machine.

Described herein is a computer storage media storing computer-readable instructions that when executed cause a computing device to: receive captured state of a first instance of an application, captured state of a first instance of a guest operating system, and, captured connectivity state associated with a plurality of running connections between the first virtual machine and one or more client devices; establish connectivity of the plurality of running connections between the second virtual machine and the one or more client devices based, at least in part, upon the captured connectivity state; establish state of a second instance of the guest operating system executing on the second virtual machine based, at least in part, upon the captured state of the first instance of the guest operating system; establish state of a second instance of the application executing on the second virtual machine based, at least in part, upon the captured state of the first instance of the guest operating system; and synchronize the state of the second instance of the application with the state of the second instance of the operating system.

The computer storage media can store further computer-readable instructions that when executed cause the computing device to: capture connectivity state by storing information regarding a firewall state associated with connectivity of the first instance of the application, storing information regarding a transport security layer associated with connectivity of the first instance of the application, and, storing information regarding at least one of an encryption key or a decryption key associated with connectivity of the first instance of the application. The computer storage media can store further computer-readable instructions that when executed cause the computing device to: capture connectivity state by storing information regarding a transmission control block associated with running connections of the first virtual machine, and, the transmission control block maintains information about endpoints, status of the running connections, data about packets that are being exchanged, and, information regarding buffers for sending and receiving data.

Figure 7:
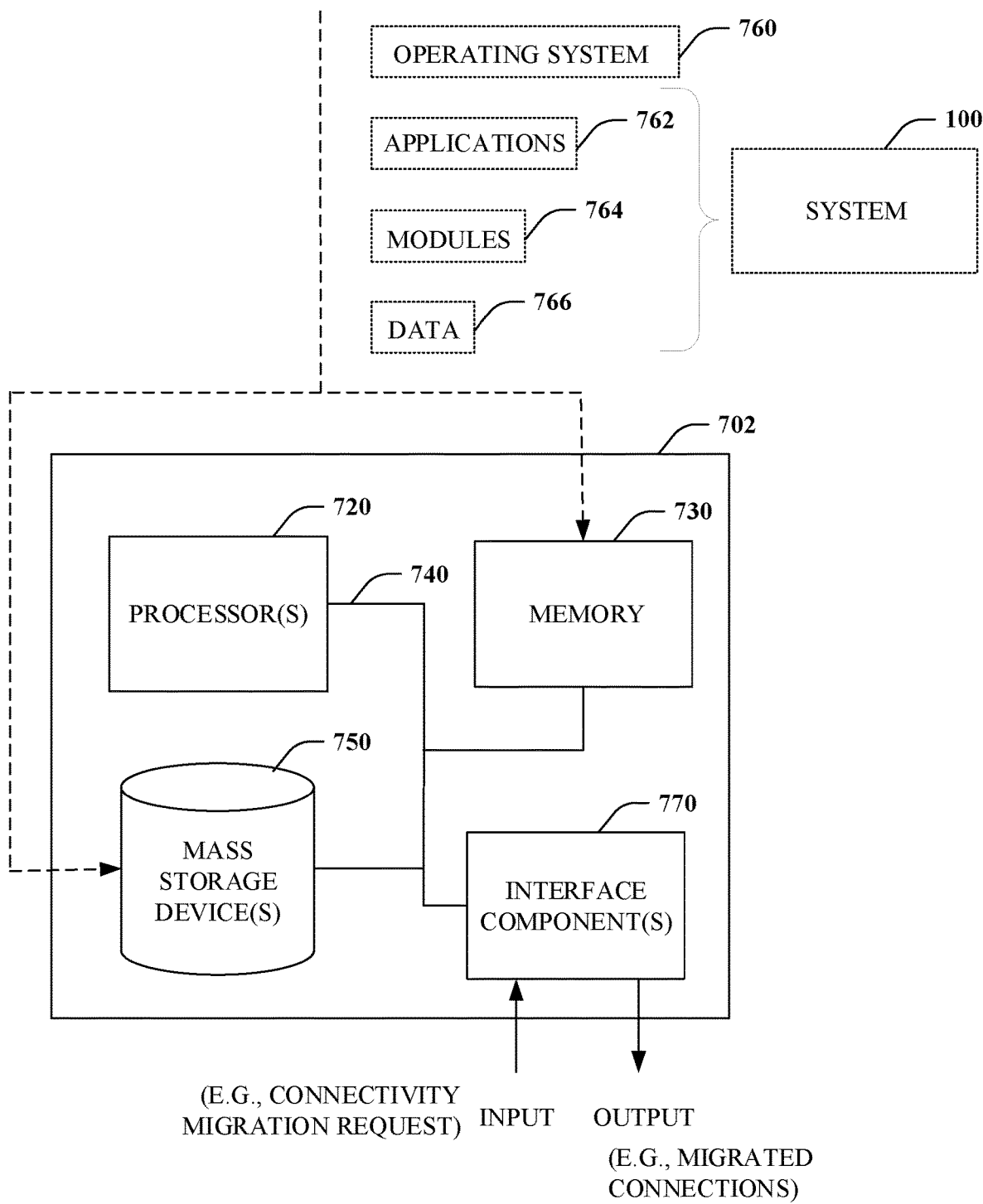
FIG. 7 is a functional block diagram that illustrates an exemplary computing system.

With reference to FIG. 7, illustrated is an example general-purpose computer or computing device 702 (e.g., mobile phone, desktop, laptop, tablet, watch, server, handheld, programmable consumer or industrial electronics, set-top box, game system, compute node, etc.). For instance, the computing device 702 may be used in a system for detecting malware by monitoring execution of a configured process 100 and/or a system for detecting malware by monitoring execution of a configured process 200.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g., serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system for migration from a first virtual machine to a second virtual machine in a virtual execution system, comprising:
    a processor and a memory having computer-executable instructions stored thereupon which, when executed by the processor, cause the system to:
    establish connectivity of a plurality of running connections between the second virtual machine and one or more client devices based, at least in part, upon a captured connectivity state of a plurality of running connections between the first virtual machine and the one or more client devices;
    establish state of a second instance of a guest operating system executing on the second virtual machine based, at least in part, upon a captured state of a first instance of the guest operating system executing on the first virtual machine;
    establish state of a second instance of an application executing on the second virtual machine based, at least in part, upon a captured state of a first instance of the application executing on the first virtual machine;
    mapping a socket handle of the first instance of the application to the second instance of the application; and
    synchronize the state of the second instance of the application with the state of the second instance of the guest operating system.

2. The system of claim 1, the memory having computer-executable instructions stored thereupon which, when executed by the processor, cause the system to:
    capture state of the first instance of the application executing on the first virtual machine;
    capture state of the first instance of the guest operating system executing on the first virtual machine;
    capture connectivity state associated with the plurality of running connections between the first virtual machine and the one or more client devices; and
    provide the captured state of the first instance of the application, the captured state of the first instance of the guest operating system, and, the captured connectivity state to the second virtual machine.

3. The system of claim 2, wherein capturing connectivity state comprises storing information regarding a firewall state associated with connectivity of the first instance of the application, and, storing information regarding a transport security layer associated with connectivity of the first instance of the application.

4. The system of claim 2, wherein capturing connectivity state comprises storing information regarding at least one of an encryption key or a decryption key associated with connectivity of the first instance of the application.

5. The system of claim 2, wherein capturing connectivity state comprises storing information regarding an Internet Protocol (IP) address of the first virtual machine.

6. The system of claim 2, wherein capturing connectivity state comprises storing information regarding a transmission control block associated with running connections of the first virtual machine.

7. The system of claim 6, wherein the transmission control block maintains information about endpoints, status of the running connections, data about packets that are being exchanged, and, information regarding buffers for sending and receiving data.

8. The system of claim 1, wherein the captured state of the first instance of the application, the captured state of the first instance of the guest operating system, and, the captured connectivity state is serialized into a pre-defined data structure.

9. The system of claim 1, wherein the second instance of the guest operating system and the second instance of the application are executing on the second virtual machine before the captured state of the first instance of the application, the captured state of the first instance of the guest operating system, and, the captured connectivity state are provided.

10. The system of claim 1, the memory having computer-executable instructions stored thereupon which, when executed by the processor, cause the system to:
suspend forwarding of network messages by a load balancer component to the first virtual machine; and
forward, by the load balancer component, network messages directed to the first virtual machine to the second virtual machine.

11. The system of claim 1, wherein the first instance of the application is a different version of the application than the second instance of the application.

12. A method of migration from a first virtual machine to a second virtual machine in a virtual execution system, comprising:
establishing connectivity of a plurality of running connections between the second virtual machine and one or more client devices based, at least in part, upon a captured connectivity state of a plurality of running connections between the first virtual machine and the one or more client devices;
establishing state of a second instance of a guest operating system executing on the second virtual machine based, at least in part, upon a captured state of a first instance of the guest operating system executing on the first virtual machine;
establishing state of a second instance of an application executing on the second virtual machine based, at least in part, upon a captured state of a first instance of the application executing on the first virtual machine;
mapping a socket handle of the first instance of the application to the second instance of the application; and
synchronizing the state of the second instance of the application with the state of the second instance of the guest operating system.

13. The method of claim 12, further comprising:
capturing state of the first instance of an application executing on a first virtual machine;
capturing state of the first instance of a guest operating system executing on the first virtual machine;
capturing connectivity state associated with the plurality of running connections between the first virtual machine and the one or more client devices; and
providing the captured state of the first instance of the application, the captured state of the first instance of the guest operating system, and, the captured connectivity state to the second virtual machine.

14. The method of claim 13, wherein capturing connectivity state comprises storing information regarding a firewall state associated with connectivity of the first instance of the application, and, storing information regarding a transport security layer associated with connectivity of the first instance of the application.

15. The method of claim 13, wherein capturing connectivity state comprises storing information regarding at least one of an encryption key or a decryption key associated with connectivity of the first instance of the application.

16. The method of claim 13, wherein capturing connectivity state comprises storing information regarding an Internet Protocol (IP) address of the first virtual machine.

17. The method of claim 13, wherein capturing connectivity state comprises storing information regarding a transmission control block associated with running connections of the first virtual machine.

18. A non-transitory computer storage media storing computer-readable instructions that when executed cause a computing device to:
establish connectivity of a plurality of running connections between a second virtual machine and one or more client devices based, at least in part, upon a captured connectivity state of a plurality of running connections between a first virtual machine and the one or more client devices;
establish state of a second instance of a guest operating system executing on the second virtual machine based, at least in part, upon a captured state of a first instance of the guest operating system executing on the first virtual machine;
establish state of a second instance of an application executing on the second virtual machine based, at least in part, upon a captured state of a first instance of the application executing on the first virtual machine;
mapping a socket handle of the first instance of the application to the second instance of the application; and
synchronize the state of the second instance of the application with the state of the second instance of the guest operating system.

19. The non-transitory computer storage media of claim 18 storing further computer-readable instructions that when executed cause the computing device to: capture connectivity state by storing information regarding a firewall state associated with connectivity of the first instance of the application, storing information regarding a transport security layer associated with connectivity of the first instance of the application, and, storing information regarding at least one of an encryption key or a decryption key associated with connectivity of the first instance of the application.

20. The non-transitory computer storage media of claim 18 storing further computer-readable instructions that when executed cause the computing device to: capture connectivity state by storing information regarding a transmission control block associated with running connections of the first virtual machine, and, the transmission control block maintains information about endpoints, status of the running connections, data about packets that are being exchanged, and, information regarding buffers for sending and receiving data.

\* \* \* \* \*